United States Patent
Alava

(10) Patent No.: US 11,310,073 B2
(45) Date of Patent: Apr. 19, 2022

(54) METHODS AND ARRANGEMENTS FOR ARRANGING DATA COMMUNICATION BETWEEN ELECTRONIC DEVICES IN A TRANSPORTATION MEANS

(71) Applicant: Teknoware Oy, Lahti (FI)

(72) Inventor: Matti Alava, Lahti (FI)

(73) Assignee: Teknoware Oy, Lahti (FI)

( * ) Notice: Subject to any disclaimer, the term of this patent is extended or adjusted under 35 U.S.C. 154(b) by 0 days.

(21) Appl. No.: 17/186,304

(22) Filed: Feb. 26, 2021

(65) Prior Publication Data
US 2021/0281439 A1    Sep. 9, 2021

(30) Foreign Application Priority Data

Mar. 4, 2020    (FI) .................................... 20205230

(51) Int. Cl.
*H04L 12/40*    (2006.01)
*G06F 1/26*    (2006.01)
*G06F 13/40*    (2006.01)

(52) U.S. Cl.
CPC ........ *H04L 12/40045* (2013.01); *G06F 1/266* (2013.01); *G06F 13/4068* (2013.01);
(Continued)

(58) Field of Classification Search
CPC .................. G11C 11/1697; G11C 5/14; H03K 19/17784; G06F 13/4068; G06F 13/4247;
(Continued)

(56) References Cited

U.S. PATENT DOCUMENTS 4,885,721 A * 12/1989 Katanosaka ......... G11C 29/835
714/710
6,397,280 B1    5/2002 Nitschke et al.
(Continued)

FOREIGN PATENT DOCUMENTS

EP    0898442 A1    2/1999
EP    2 408 053 A2    1/2012
(Continued)

OTHER PUBLICATIONS

Finnish Search Report for corresponding Finnish Patent Application No. 20205230 dated Jun. 16, 2020, 2 pages.
(Continued)

*Primary Examiner* — Faisal M Zaman
(74) *Attorney, Agent, or Firm* — Merchant & Gould P.C.

(57) ABSTRACT

An electronic device (201) of a transportation means comprises a power bus input interface (202), a power bus output interface (203), and a data bus interface (204). The device comprises voltage reducing means (205) for selectively performing a controlled voltage reduction between the power bus input interface (202) and the power bus output interface (203). The reduced operating voltage is lower than the operating voltage received via the power bus input interface (202) but higher than zero. The device is arranged to use (1201, 1202) said voltage reducing means depending in a predetermined manner on whether or not the device has performed addressing operations to carry out addressed data communication by means of said data bus.

10 Claims, 8 Drawing Sheets

Figure 1:
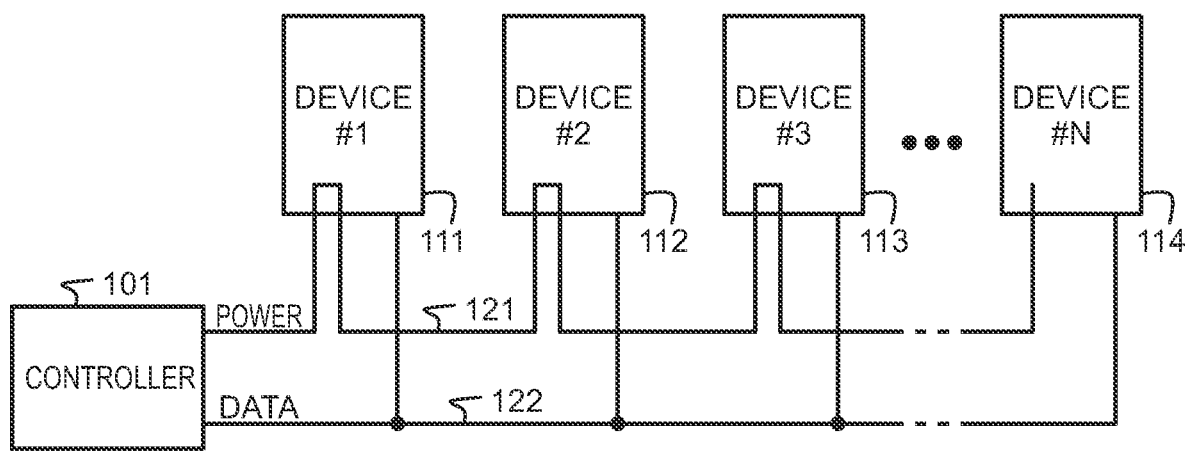

(52) U.S. Cl.
CPC ............. *H04L 12/40013* (2013.01); *H04L 2012/40267* (2013.01)

(58) Field of Classification Search
CPC .. G06F 13/4282; G06F 1/266; G06F 12/0676; G06F 13/404; G06F 13/36; H04L 12/40045; H04L 12/40013; H04L 2012/40267; H04L 12/403; Y02D 10/00; B60Q 3/47; B60Q 3/80; H05B 47/18
USPC .......................................... 365/226; 713/310
See application file for complete search history.

(56) References Cited

U.S. PATENT DOCUMENTS

| | | | | |
|---|---|---|---|---|
| 6,625,791 | B1* | 9/2003 | Bobba | G06F 30/39 |
| | | | | 716/122 |
| 7,821,226 | B2* | 10/2010 | Froeschl | G01R 31/396 |
| | | | | 320/104 |
| 2004/0042138 | A1* | 3/2004 | Saito | G06F 1/266 |
| | | | | 361/90 |
| 2005/0271077 | A1* | 12/2005 | Hartzsch | G06F 13/36 |
| | | | | 370/451 |
| 2009/0021955 | A1 | 1/2009 | Kuang et al. | |
| 2010/0001582 | A1* | 1/2010 | Newhouse | B60L 50/50 |
| | | | | 307/10.1 |
| 2010/0008175 | A1* | 1/2010 | Sweere | G06F 12/0866 |
| | | | | 365/229 |
| 2013/0114614 | A1 | 5/2013 | Tran et al. | |
| 2017/0222275 | A1* | 8/2017 | Krishnan | H02J 7/0013 |
| 2017/0256957 | A1* | 9/2017 | Buiel | H02M 3/04 |
| 2019/0166089 | A1* | 5/2019 | Schmitz | G06F 13/4247 |
| 2020/0176976 | A1* | 6/2020 | Lewandowski | H04L 61/2038 |
| 2021/0318981 | A1* | 10/2021 | Jurski | G06F 13/404 |

FOREIGN PATENT DOCUMENTS

| | | |
|---|---|---|
| EP | 2 656 694 B1 | 3/2018 |
| WO | 2012/085816 A1 | 6/2012 |

OTHER PUBLICATIONS

Extended European Search Report for EP Application No. 21159676.2 dated Sep. 9, 2021 (5 pages).

* cited by examiner

METHODS AND ARRANGEMENTS FOR ARRANGING DATA COMMUNICATION BETWEEN ELECTRONIC DEVICES IN A TRANSPORTATION MEANS

This application claims benefit of Serial No. 20205230, filed 4 Mar. 2020, in Finland and which application is incorporated herein by reference. To the extent appropriate, a claim of priority is made to the above disclosed application.

FIELD OF THE INVENTION

The invention relates in general to arrangement of data communication between a controlling electronic device (master) and responding electronic devices (slave) in a transportation means. Specifically, the invention relates to how the responding devices connected to a common data bus are each in turn caused to perform addressing in cooperation with the controlling device.

BACKGROUND OF THE INVENTION

Electronic devices of a transportation means, such as controller cards controlling the light sources, sensors measuring the prevailing conditions, etc., are usually connected to a common data bus to arrange data communication between them. The bus is typically provided with one controlling device (master), the others being responding devices (slave). From some implementations, also so-called multi-master solutions in which one data bus may be provided with two or more controlling devices, and/or in which one or more devices may alternately act as a responding or a controlling device, are known. Systematic and device-specific targeting enabling data communication on the common data bus requires that each slave device has an address which is known to each of the master devices.

Addressing refers to operations for reaching a state in which a unique address of each slave device is known to both of the device itself and to the relevant master device or devices. For smooth installation, deployment, and maintenance operations it is advantageous if the devices are able to automatically handle the addressing. In transportation means, this type of operation may be different than for example in buildings, because in transportation means, the availability of operating voltage may vary and because the electronic devices may have different functions depending on whether the transportation means is actively in use or for example waiting at a depot.

FIG. 1 illustrates a plurality of electronic devices of a transportation means, of which the master device is herein denoted a controller 101, and wherein the slave devices are numbered devices 111, 112, 113 and 114. In this implementation, from the controller 101 to devices 111-114, a power bus 121 for delivering the operating voltage to the devices and a separate data bus 122 for arranging the data communication are provided.

From patent publication EP2656694B1, a procedure for performing addressing in the system according to FIG. 1 is known. Therein, each of the slave devices 111-114 is initially in a state in which it prevents the passage of the operating voltage on the power bus 121 to those devices which are situated farther away from the master device 101 along the power bus than the device itself. In other words, initially only the first slave device 111 receives the operating voltage from the power bus 121. When it has completed its addressing with the master device 101, it allows the passage of the operating voltage through it on the power bus 121, whereby the next slave device 112 receives the operating voltage and may in turn perform the required operations for addressing. This way, the addressing turn is passed forward one device at a time on the power bus 121, until all of the slave devices 111-114 have been addressed.

While the procedure of the cited publication functions reliably, it has problems. For example a situation where the second slave device 112 is damaged and it must be replaced may be considered. The new device installed in its place does not yet have an address, so immediately after installation it is in a state in which it prevents the third, fourth, etc. slave device from receiving any operating voltage. In other words, the remainder of the power bus is "down" until the new device has been addressed. If the slave devices are for example light fixtures, this may hinder the operation of the maintenance worker. If along the bus there are sensors or other such devices which should be continuously in operation, their operation will inevitably be paused, at least for the time it takes to address the new device.

SUMMARY OF THE INVENTION

It is an objective of the present invention to introduce electronic devices of a transportation means and methods performed by the devices, by means of which it is possible to perform addressing without the typical drawbacks of the prior art. It is also an objective of the invention that by means of it the addressing is easy, quick and automatic and suited equally well for the first introduction of new systems as well as for maintenance situations in which some devices may need to be replaced or added.

The objectives of the invention are achieved by providing responding electronic devices with means for controlled, selective voltage reduction on a power bus led through them and by arranging this voltage reduction to depend on whether the given responding device has been addressed or not.

According to a first aspect, an electronic device of a transportation means is disclosed, comprising a power bus input interface for receiving an operating voltage from a power bus, a power bus output interface for conveying the operating voltage forward on said power bus, and a data bus interface for carrying out data communication by means of a data bus connected to the data bus interface. The device comprises voltage reducing means for selectively performing a controlled voltage reduction between said power bus input interface and power bus output interface, to convey a reduced operating voltage forward on said power bus, which reduced operating voltage is lower than the operating voltage received via said power bus input interface but higher than zero. The device is arranged to use said voltage reducing means depending in a predetermined manner on whether or not the device has performed addressing operations to carry out addressed data communication by means of said data bus.

According to one embodiment the device is arranged to perform said controlled voltage reduction in response to the operating voltage received via the power bus input interface being higher than a predetermined first limit value and the device not having performed said addressing operations. This provides the advantage that when there are several devices along the same bus, it is possible to efficiently and unequivocally influence by way of the voltage reductions which one of the devices gets the addressing turn at a given time.

According to one embodiment the device is arranged to omit to perform said controlled voltage reduction in response to the operating voltage received via the power bus input interface being lower than said predetermined first limit value. This provides the advantage that after a specific limit, the devices farther away along the same bus still receive in any case at least a limited operating voltage.

According to one embodiment the device is arranged to omit to perform said controlled voltage reduction in response to the device having performed said addressing operations. This provides the advantage that a device having completed its addressing may in a sense become transparent, such that its operation does not hinder the addressing operations of devices which have not yet performed them.

According to one embodiment the device is arranged to start said addressing operations in response to the device not having performed said addressing operations and the operating voltage received via the power bus input interface being higher than a second limit value. This provides the advantage that the controlling device has good possibilities to influence which of the devices starts the addressing operations at a given time.

According to one embodiment the device is arranged to receive information of said second limit value via said data bus interface. This provides the advantage that the controlling device may control, by means of queries sent via the data bus, which of the devices along the bus has the addressing turn.

According to one embodiment the device is arranged to measure whether a difference of the operating voltage received via the power bus input interface and a data bus voltage measured via the data bus interface is smaller than a third limit value. The device is then arranged to start said addressing operations in response to the device not having performed said addressing operations and the difference of the operating voltage received via the power bus input interface and the data bus voltage measured via the data bus interface being smaller than said third limit value. This provides the advantage that the controlling device may control which of the devices along the bus has the addressing turn even with mere analogue voltage values, not yet necessarily having to start any digital communication with the devices at this stage.

According to a second aspect, an electronic controller device of a transportation means for controlling at least one electronic device as described above is disclosed. The controller device comprises a power bus supply interface for supplying an operating voltage to said power bus, and a controller device data bus interface for carrying out data communication by means of said data bus. It further comprises means for sending an addressing query on said data bus for causing said at least one electronic device to start addressing operations. The addressing query involves information of a limit value sent on said data bus, wherein said at least one electronic device has to receive a voltage higher than that limit value from the power bus in order to start the addressing operations, or a voltage applied for a specified time to said data bus, which voltage is closer to the power bus voltage than the voltage used for data communication on said data bus.

According to a third aspect, a method for performing addressing operations in an electronic device of a transportation means is disclosed. The method comprises receiving an operating voltage from a power bus of the transportation means, conveying the operating voltage forward on said power bus, and carrying out data communication via a data bus. Further, the method comprises selectively reducing the operating voltage conveyed to the power bus to a voltage in a controlled manner lower than the received operating voltage but different from zero, depending in a predetermined manner on whether or not the device has performed addressing operations to carry out addressed data communication by means of said data bus.

According to one embodiment the method comprises performing said controlled voltage reduction in response to the received operating voltage being higher than a predetermined first limit value and the device not having performed said addressing operations. This provides the advantage that when there are several devices along the same bus, it is possible to efficiently and unequivocally influence by way of the voltage reductions which one of the devices gets the addressing turn at a given time.

According to one embodiment the method comprises omitting to perform said controlled voltage reduction in response to the received operating voltage being lower than said predetermined first limit value and/or the device having performed said addressing operations. This provides the advantage that after a specific limit, the devices farther away along the same bus still receive in any case at least a limited operating voltage, and a device having completed its addressing may in a sense become transparent, such that its operation does not hinder the addressing operations of devices which have not yet performed them.

According to one embodiment the method comprises starting said addressing operations in response to the device not having performed said addressing operations and the operating voltage received via a power bus input interface being higher than a second limit value. This provides the advantage that the controlling device has good possibilities to influence which of the devices starts the addressing operations at a given time.

According to one embodiment the method comprises receiving information of said second limit value via said data bus. This provides the advantage that the controlling device may control, by means of queries sent via the data bus, which of the devices along the bus has the addressing turn.

According to one embodiment the method comprises measuring whether a difference of the received operating voltage and a measured data bus voltage is smaller than a third limit value, and starting said addressing operations in response to the device not having performed said addressing operations and the difference of the received operating voltage and the measured data bus voltage being smaller than said third limit value. This provides the advantage that the controlling device may control which of the devices along the bus has the addressing turn even with mere analogue voltage values, not yet necessarily having to start any digital communication with the devices at this stage.

LIST OF FIGURES

Figure 2:
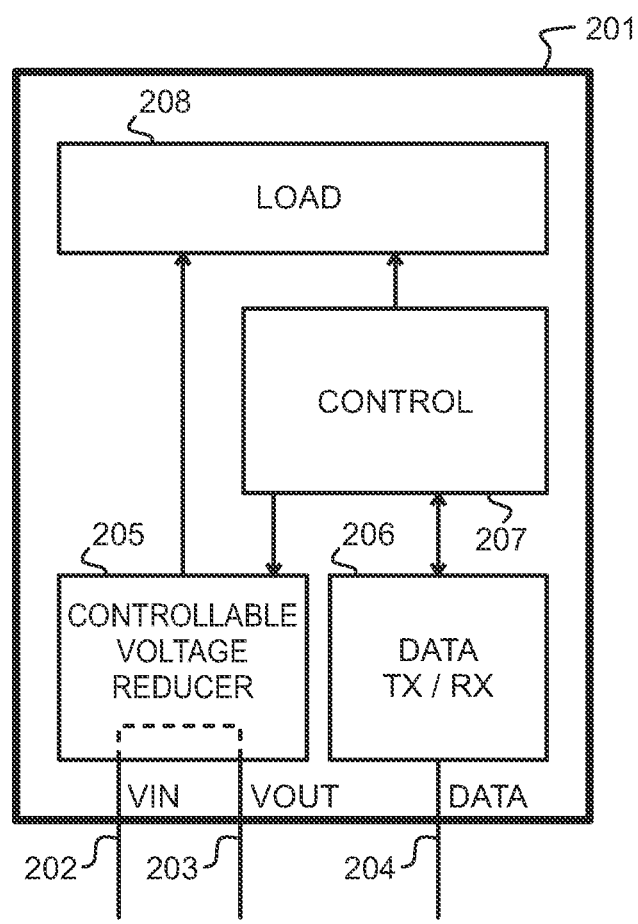
Figure 3:
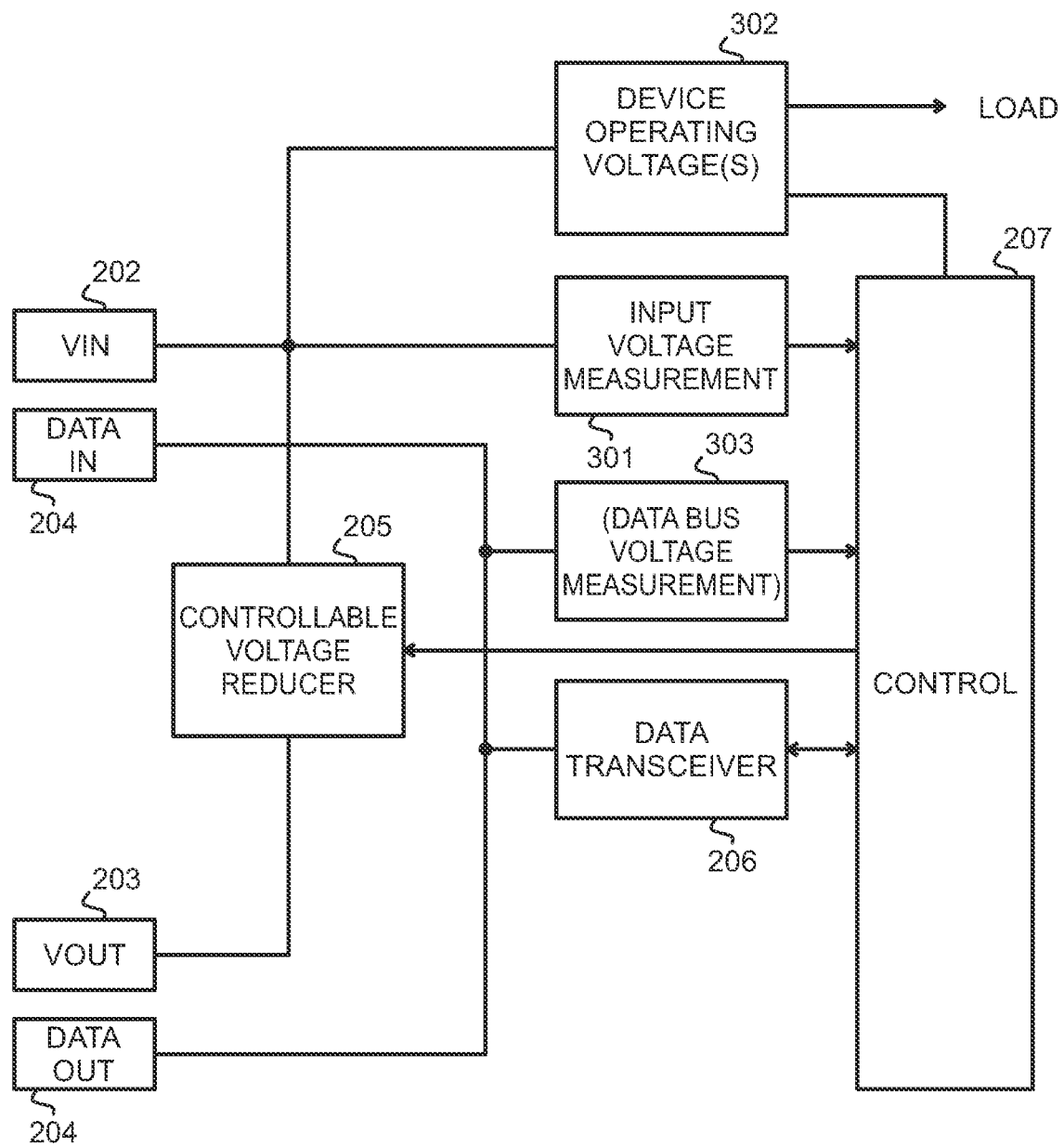
Figure 4:
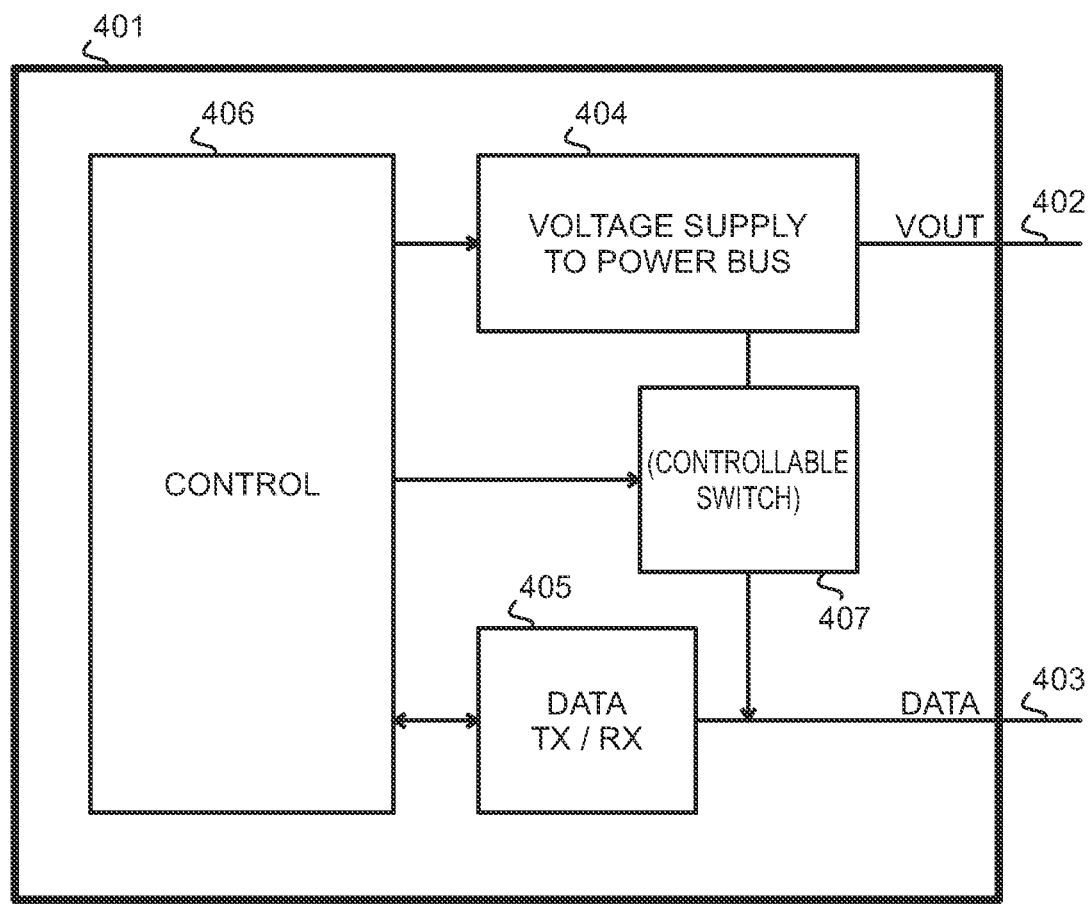
Figure 5:
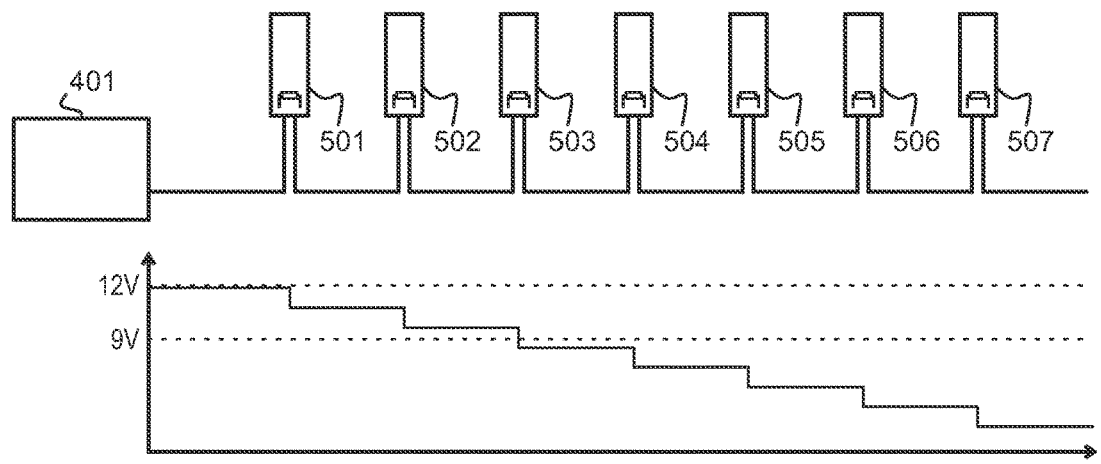
Figure 6:
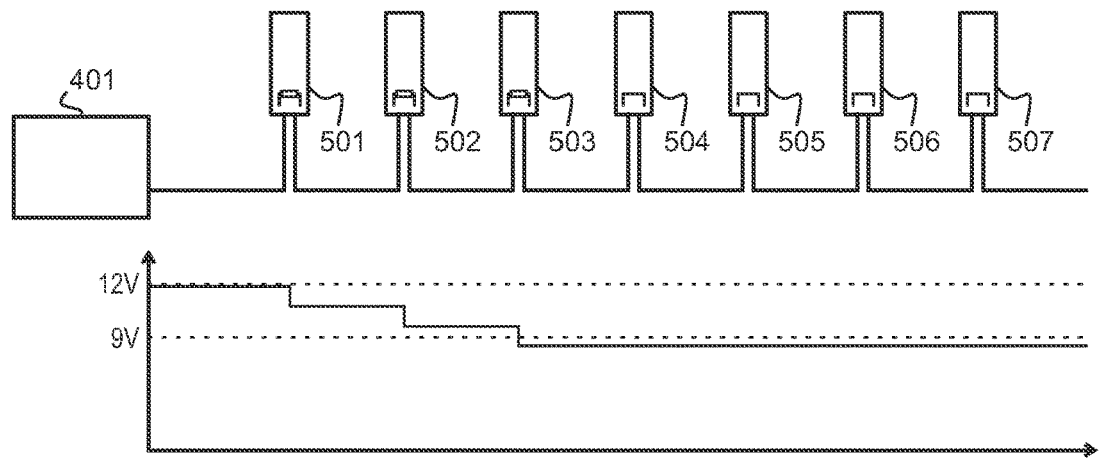
Figure 7:
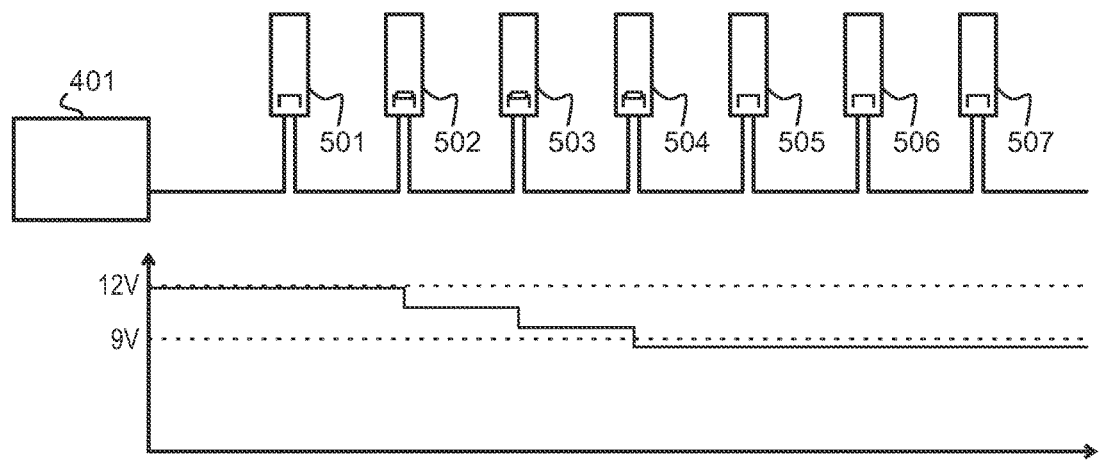
Figure 8:
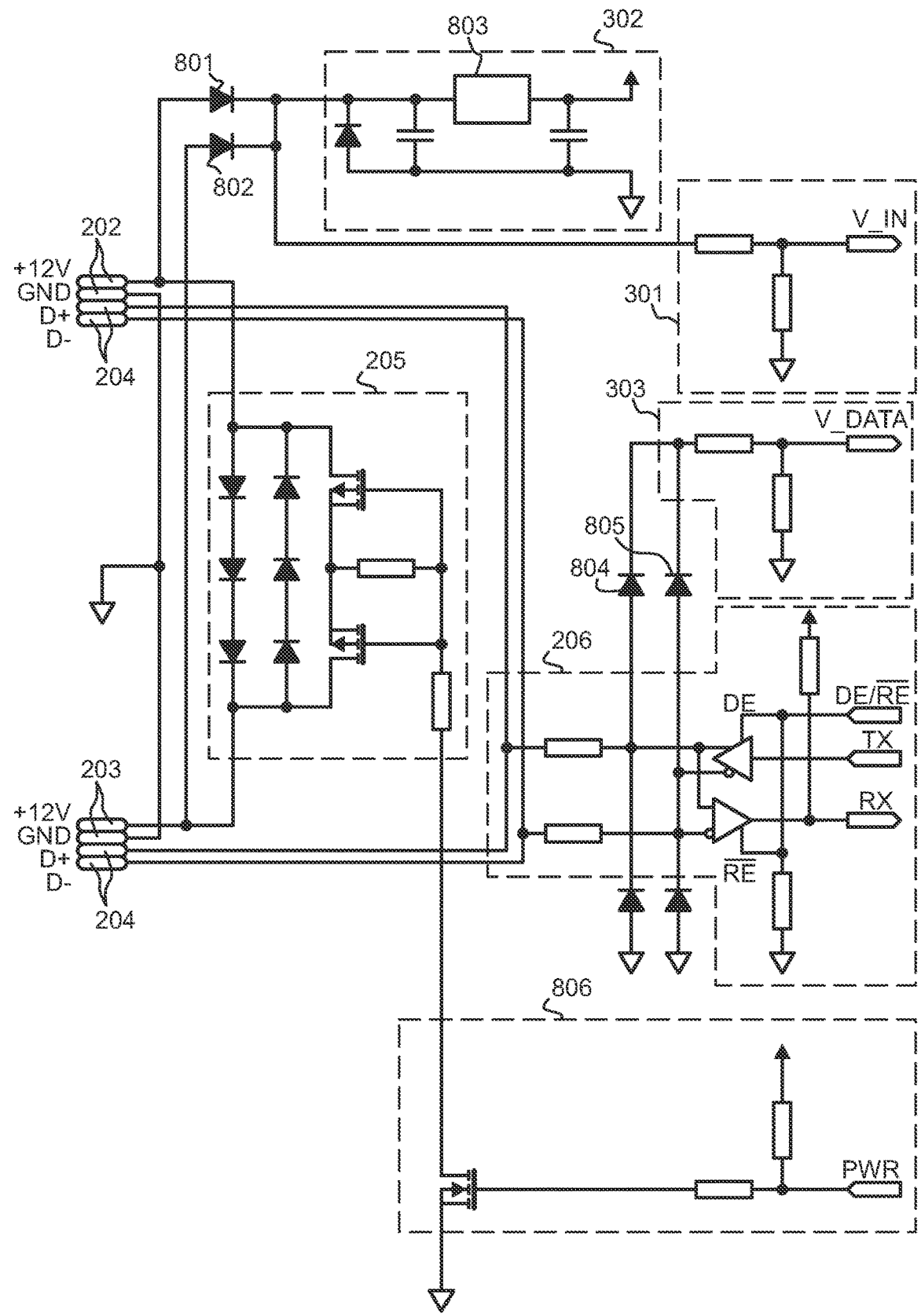
Figure 9:
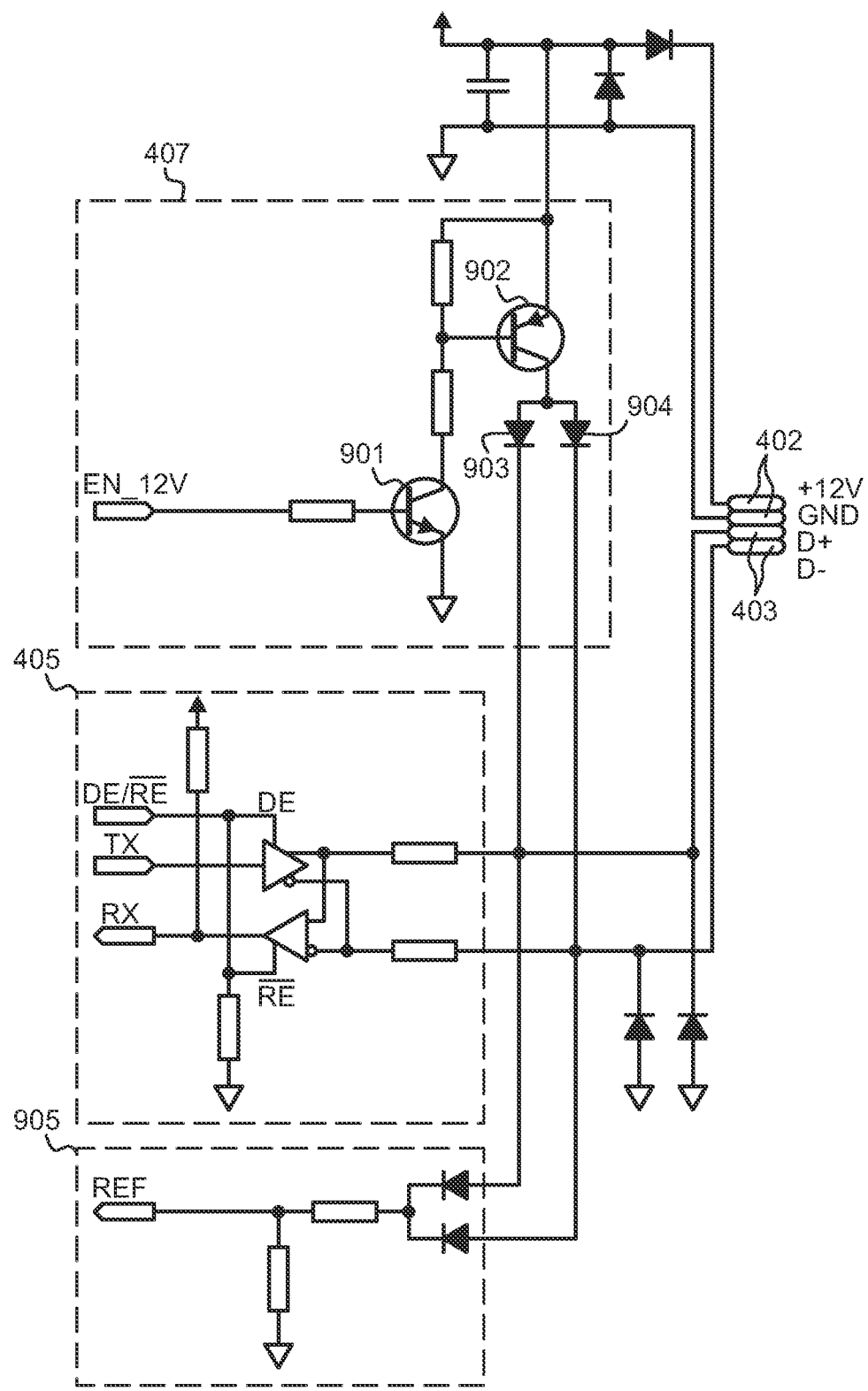
Figure 10:
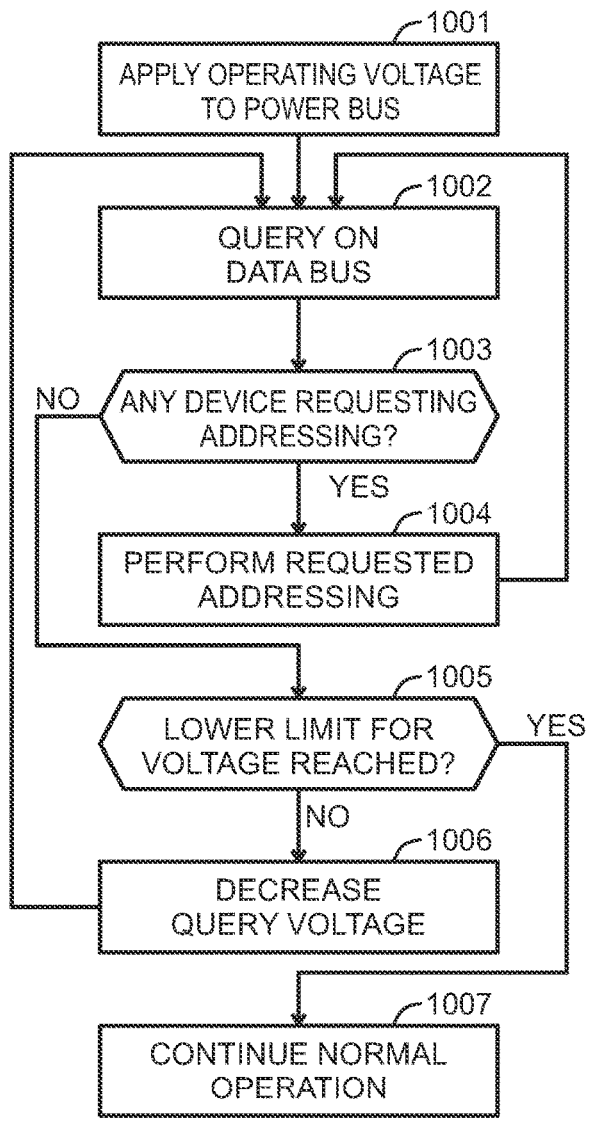
Figure 11:
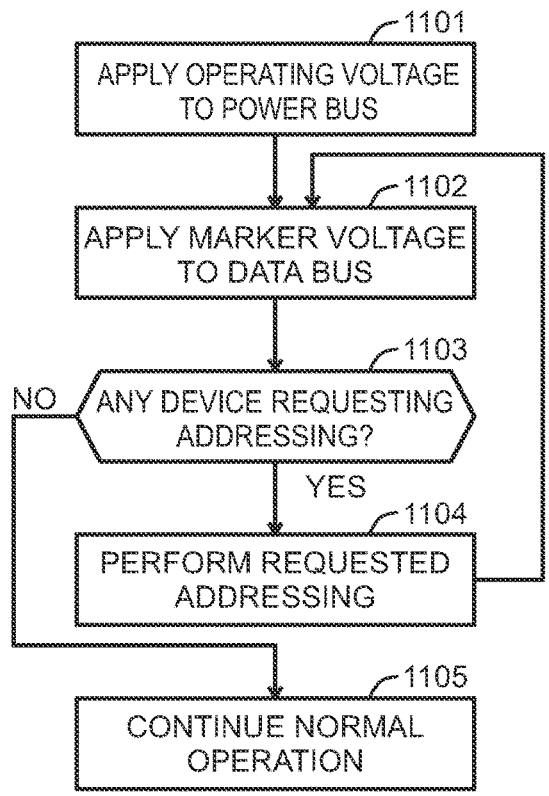
Figure 12:
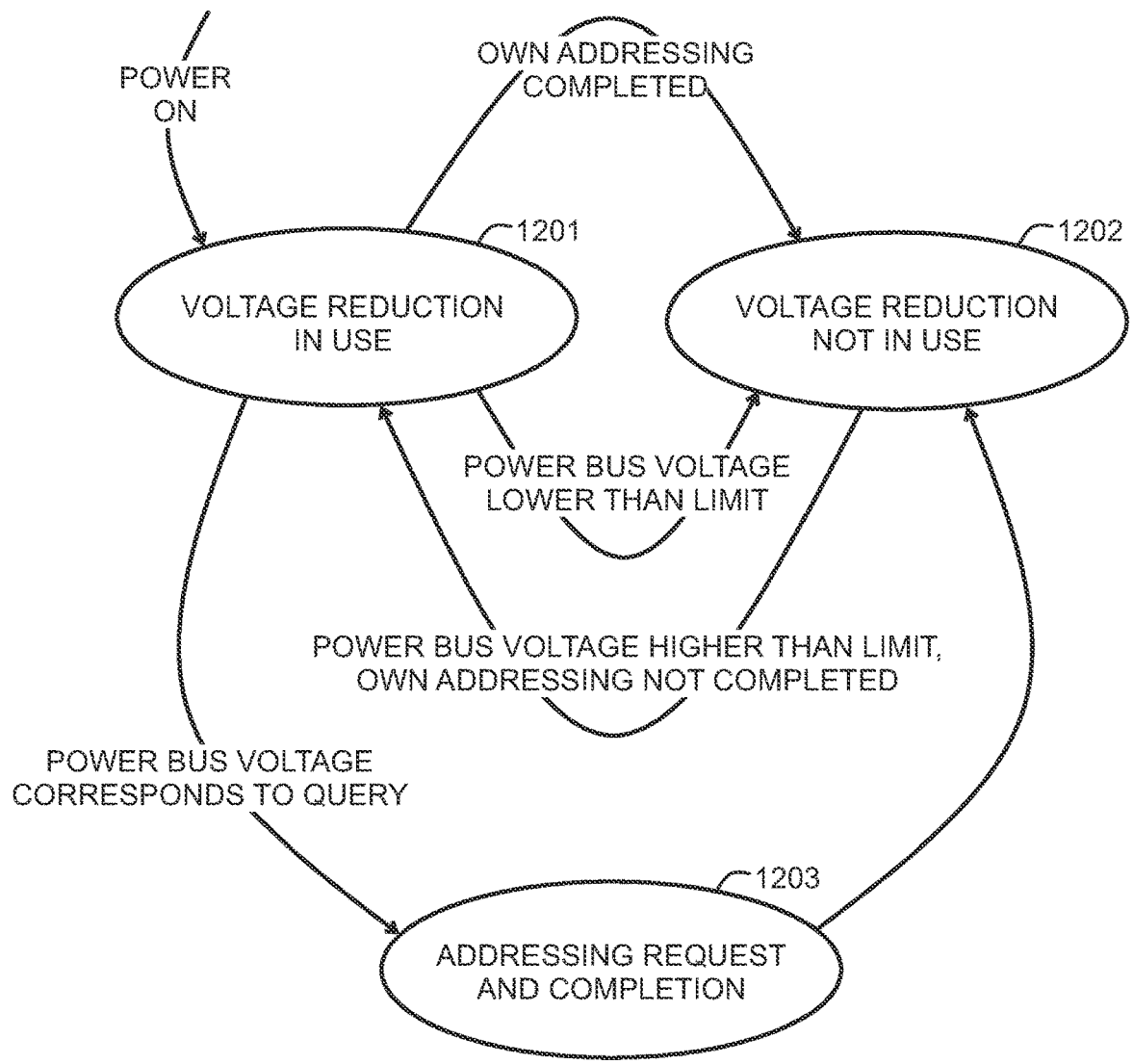
Figure 13:
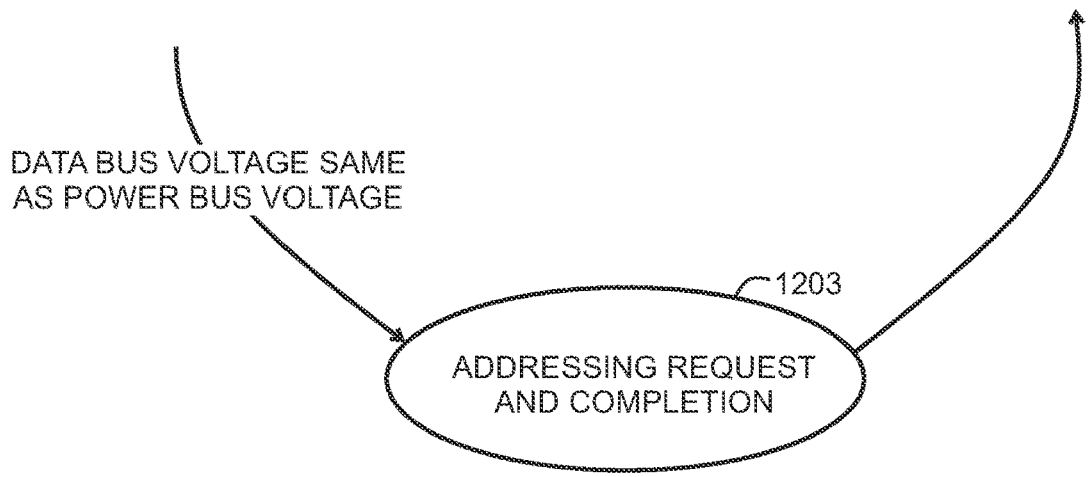

FIG. 1 illustrates electronic devices connected by power and data buses in a transportation means, FIG. 2 illustrates a responding electronic device according to one embodiment, FIG. 3 illustrates functions of one responding electronic device, FIG. 4 illustrates functions of one controlling electronic device, FIG. 5 illustrates devices connected by a power bus in a first situation, FIG. 6 illustrates devices connected by a power bus in a second situation, FIG. 7 illustrates devices connected by a power bus in a third situation, FIG. 8 illustrates a circuit diagram of a part of one responding electronic device, FIG. 9 illustrates a circuit diagram of a part of one controlling electronic device, FIG. 10 illustrates one method, FIG. 11 illustrates one method, FIG. 12 illustrates one method, and FIG. 13 illustrates one method.

DETAILED DESCRIPTION OF THE INVENTION

FIG. 2 illustrates an electronic device 201 of a transportation means in the form of a schematic block diagram, which electronic device may be for example a light fixture of the transportation means, a measuring device measuring some factor related to the use of the transportation means, or another electronic device. It comprises a power bus input interface 202 for receiving an operating voltage VIN from a power bus which is used in the transportation means in question for distributing the operating voltage to electronic devices. The device 201 also comprises a power bus output interface 203 for conveying an operating voltage VOUT forward on the power bus in question. Thus, the power bus of the transportation means forms a type of loop via the device 201. Further, the device 201 comprises a data bus interface 204 for carrying out data communication by means of a data bus connected to the data bus interface 204. The present disclosure specifically relates to an internal data bus of a transportation means, whereby in view of the operation of the data bus, the device 201 as presented herein is a responding device, i.e. a slave device, and the data communication carried out on the data bus is controlled by a separate controlling device, i.e. a master device. Along the same data bus there are typically several slave devices, and there may also be two or more master devices along the data bus.

The device 201 comprises voltage reducing means 205 for selectively performing a controlled voltage reduction between the power bus input interface 202 and output interface 203. The controlled aspect of the voltage reduction is intended to mean that the device 201 is able to reduce the voltage relatively accurately by a specific amount of volts: in other words, VOUT=VIN−ΔV is satisfied, wherein the magnitude of the positive value ΔV is known with some practically relevant accuracy, for example with an accuracy of some tenths of a volt or one volt. Selectively performing the voltage reduction is intended to mean that the device 201 may influence with its own operation the performing or not performing said voltage reduction. When the voltage reduction is in use, the device 201 conveys the reduced operating voltage VOUT forward on the power bus, which reduced operating voltage is lower than the operating voltage received via the power bus input interface 202 but higher than zero. In other words, the voltage reducing means 205 do not fully prevent the voltage flow on the power bus.

Other functional blocks illustrated in FIG. 2 are a data communication transceiver 206 connected to the data bus interface 204, a controlling block 207, and a load 208 which may consist for example of one or more light sources, if the device 201 is a light fixture. It is of relevance for the purpose of the discussion presented herein that the device 201 is arranged to use said voltage reducing means 205 depending in a predetermined manner on whether or not it has performed addressing operations to carry out addressed data communication by means of the data bus. Illustrative examples will be presented hereinafter on what this predetermined dependency between the performing or not performing the addressing operations and the use of the voltage reducing means 205 may be like.

FIG. 3 illustrates one electronic device of a transportation means in the form of a slightly more detailed block diagram. The blocks corresponding to blocks according to FIG. 2 are denoted by the same reference numbers: power bus input interface 202, power bus output interface 203, data bus interface 204, voltage reducing means 205, data communication transceiver 206, and controlling block 207, in which for example a microprocessor or a microcontroller may be provided as a part executing the functions. The data bus interface 204 is divided into two parts in FIG. 3, as if there would be a different interface for input and output data communication, but on the other hand, within the device they are in direct connection with each other, so they may also be included in the same physical interface.

FIG. 3 further shows an input voltage measurement block 301, by the use of which the device may measure what is the magnitude of the operating voltage received via the power bus input interface 202. For this purpose, the input voltage measurement block 301 is connected to the power bus input interface 202. It is also connected to the controlling block 207 for conveying the measured value of the received operating voltage to the controlling block 207.

FIG. 3 also shows the device's own operating voltage or own operating voltages generation block 302, which is in charge of converting, as needed, the operating voltage level received via the power bus input interface 202 into that voltage level or those voltage levels which are needed for the internal parts and the load of the device. The operating voltages generation block 302 may include, in a manner obvious as such, for example voltage level converters, filters, overcurrent and overvoltage protections and the like. A comparison between FIGS. 2 and 3 shows that while in the simplified representation of FIG. 2 the connection from the power bus to the load and other parts of the device would seem to be provided via the voltage reducing means 205, the generation of the device's own operating voltage may be completely separate of the voltage reducing means 205 as illustrated in FIG. 3.

Yet one block shown in FIG. 3 is a data bus voltage measurement block 303. It is connected to the data bus interface 204, and by means thereof the control block 207 may be informed of the instantaneously measured voltage level on the data bus. The data bus voltage measurement block 303 is not needed in all embodiments; the possible need thereof and its use will be explained more specifically hereinafter.

FIG. 4 illustrates, in the form of a schematic block diagram, an electronic controller device of a transportation means according to one embodiment, i.e. a master device 401, which may be used for controlling at least one device as described above. The master device 401 comprises a power bus supply interface 402 for supplying an operating voltage to the power bus, and a controller device data interface 403 for carrying out data communication by means of the data bus. Voltage supply to the power bus takes place in block 404, and for carrying out the data communication the master device 401 comprises a data communication transceiver 405. A controlling block 406 is arranged to control the operation of the master device. The master device may comprise a controllable switch 407 for selectively establishing a temporary connection from block 404 to the data bus, but this is not necessary in all embodiments.

If the controllable switch 407 is provided, the controlling block 406 controls its operation like any other functions of the master device 401.

FIGS. 5, 6, and 7 illustrate the effect slave devices 501-507 have on the power bus voltage level in some situations by using the voltage reducing means included therein. The purpose is to distribute turns to the slave devices 501-507 for performing addressing operations using the power bus voltage level to indicate the turns. In FIGS. 5, 6 and 7, the resistor symbol drawn in the slave device means that the slave device in question is currently performing the voltage reduction. A conductor bend without the resistor symbol means that the slave device is not currently performing the voltage reduction. In each of the figures, the voltage diagram drawn in the lower part of the figure illustrates the power bus voltage as a function of distance, wherein the distance means distance from the master device 401 along the power bus.

Each slave device 501-507 is arranged to perform the above-mentioned controlled voltage reduction in response to the operating voltage received by the device via the power bus input interface being higher than a predetermined first limit value and the device not yet having performed the above-mentioned addressing operations. In FIG. 5-7, the predetermined first limit value in question is 9 V, whereas the normal, unreduced voltage level of the power bus is 12 V. On the other hand, each slave device 501-507 is also arranged to omit to perform said controlled voltage reduction in response to the operating voltage received by the device via the power bus input interface being lower than said predetermined first limit value, in other words, herein lower than 9 V.

The voltage values given herein are obviously examples only, and bear no limiting effect. The normal, unreduced voltage level of the power bus may be almost any voltage level found appropriate for a specific application. Certain advantage is gained if a voltage level falling within the limits of Safe Extra Low Voltage (SELF) is selected as the power bus voltage level, because in that case it is simpler to implement some of the structural details related to electrical safety in different parts of the system. The above-described predetermined first limit value should preferably be selected to be that much smaller than the normal, unreduced voltage level of the power bus that it will be certainly broken with controlled voltage reductions performed by no more than three successive devices. This ensures that only a small number of devices may have the addressing turn at a time, whereby it is unlikely that even great device-specific variations in measurement accuracy or component values would cause a mix-up as to which one of the devices gets the addressing turn at a given time.

FIG. 5 illustrates a situation in which the master device 401 has just applied the normal voltage, in this example 12 volts, to the power bus. By default, the voltage reduction is in use in each slave device as the device wakes up. As a result, the power bus voltage decreases at each slave device by ΔV as mentioned above. After having woken up, each slave device measures whether its received power bus voltage level is lower or higher than said predetermined first limit value, herein 9 V. In the situation of FIG. 5, slave devices 501, 502 and 503 which are closest to the master device 401 measure a voltage above 9 volts on the power bus, whereas slave devices 504, 505, 506 and 507 located farther away measure a voltage below 9 volts. The measurement stage is followed by a situation according to FIG. 6, wherein slave devices 504, 505, 506 and 507 have omitted to perform the voltage reduction. In other words, the power bus voltage decreases by steps equal to ΔV at slave devices 501, 502 and 503, but is substantially the same for all those slave devices which are located on the power bus after device 503.

It is not necessary for devices 504-507 which measured a lower voltage than the limit value to omit to perform the voltage reduction. The operation could continue right away from the situation illustrated in FIG. 5. However, the operating alternative described herein provides the advantage that also on a long power bus passing via several slave devices, all of the devices will still receive a relatively reasonable voltage level from the power bus. Thus, they may already at this stage operate at least in some such manner which does not require them to have completed their addressing operations at that exact time. If the slave devices are for example light fixtures, they may already at this stage keep the lights switched on at least at some limited brightness level. As another example, if the slave devices comprise sensors, they may already at this stage collect measurement data and store the data for being sent at a later stage in which their addressing operations have been completed.

Further to what has been described above, in the embodiment of FIG. 5-7 it is assumed that the turn for performing the addressing operations is always assigned to that slave device which receives the highest voltage level from the power bus. Furthermore, it is assumed herein that each slave device is arranged to omit to perform said controlled voltage reduction in response to the device having completed its addressing operations. In the situation of FIG. 6, the first slave device 501 has thus the turn to perform the addressing operations. When it has completed its addressing operations, it cancels the voltage reduction it has performed up to this point. This leads to the situation illustrated in FIG. 7. In other words, slave devices 502 and 503 perform the voltage reduction as previously, but because the full 12-volt voltage of the power bus is now able to reach the second slave device 502, also the fourth slave device 504 receives a higher voltage than the previously mentioned first limit value (9 V) from the power bus and switches on its own voltage reduction.

By following through what has been explained above, it is easy to see that as the slave devices are completing their addressing operations one by one, the three-step decrease in the power bus voltage level moves farther away from the master device 401 one device at a time. When also the last slave device has completed its addressing operations, all of the slave devices will have come to a state in which they do not perform the voltage reduction.

There are several possibilities to ensure that always the slave device receiving the highest voltage level from the power bus understands it has the addressing turn. According to one embodiment, each slave device is arranged to start the addressing operations in response to, firstly, the device not yet having performed said addressing operations and, secondly, the operating voltage received by it via its power bus input interface being higher than a second limit value. This second limit value may be permanently programmed on each slave device, whereby it is only a matter ensuring that a difference between it and the normal voltage level of the power bus is smaller than ΔV as mentioned above. If it was greater than ΔV, it would be possible that two or more of the slave devices at the beginning on the power bus would suppose they have gotten the turn to start the addressing operations at the same time.

However, the embodiment described above may be specified by each slave device being arranged to receive information of said second limit value via said data bus interface.

This way, it is possible to specifically take into account that due to losses, variation of component values and functional tolerances, the power bus voltage values measured by different slave devices may slightly vary. The master device 401 may send a query to the slave devices via the data bus, notifying it gives the addressing turn to the slave device currently measuring a power bus voltage of at least 11.9 volts. If none of the slave devices responds, the master device may send a new query, notifying that the limit value is 11.8 volts and so on, until the slave device measuring the highest current power bus voltage responds. By repeating these query rounds and lowering in each case the limit value given in the query by less than $\Delta V$, the master device may ensure that no more than one slave device at a time will respond.

It is not relevant in the invention in which form the second limit value is given by means of the data bus. The master device 401 may give the limit value directly as a number, as above (11.9 V; 11.8 V, etc.). Alternatively, it may give a margin for how much the power bus voltage measured by the slave device may differ from the nominal normal voltage of the power bus (0.1 V; 0.2 V, etc.).

Another embodiment for ensuring that always the slave device receiving the highest voltage level from the power bus understands it has the addressing turn is based on the use of means 303 and 407 described above in connection with FIGS. 3 and 4. The master device 401 may momentarily close the controllable switch 407, such that the data bus voltage will be the same as the voltage currently supplied by the master device 401 to the power bus. Each slave device is then arranged to measure whether the operating voltage it receives via its power bus input interface and the data bus voltage it measures via its data bus interface are equally high. In practice, to take into account the losses, component tolerances, etc., it may be best to allow a small difference for them, whereby the slave device is arranged to measure whether a difference of the operating voltage received via the power bus input interface and the data bus voltage measured via the data bus interface is smaller than a third limit value. The slave device is then arranged to start the addressing operations in response to the device not yet having performed said addressing operations and the difference of the operating voltage received via the power bus input interface and the data bus voltage measured via the data bus interface being smaller than said third limit value.

The above-mentioned third limit value may be permanently programmed on the slave devices, or it may be transmitted via the data bus in the same manner as the above-mentioned second limit value. If necessary, the master device may increment the third limit value it communicates via the data bus, if it does not receive the queried responses from the slave devices.

FIG. 8 illustrates an exemplary circuit diagram of the functional blocks of the slave device denoted above in FIGS. 2 and 3 by reference numbers 202, 203, 204, 205, 206, 301, 302 and 303. The power bus input interface 202 and output interface 203 are both bipolar, such that one of the terminals is nominally a ground potential terminal (GND) and the other is nominally a positive terminal (+12V). The denominations are nominal because the coupling illustrated in the figure is designed to be polarity-free, such that in practice it is not relevant how the two terminals are connected to the two power bus conductors. The data bus interface 204 is illustrated in FIG. 8 as encompassing two bipolar interfaces, but because the terminals are directly connected to each other within the device, they may also be physically the same bipolar interface. It is also designed to be polarity-free herein.

In the upper part of the figure, parallel diodes 801 and 802 establish a connection from the nominally positive terminal of the power bus to the operating voltages generation block 302, which is herein illustrated as comprising two filtering capacitors, a protection diode and a linear regulator 803. The input voltage measurement block 301 consists of a voltage divider formed by two resistors which is connected between the input of the operating voltages generation block 302 and the local ground potential, and from the centre of which a connection V_IN is provided to the processor of the slave device (which is not illustrated in the figure). The data communication transceiver 206 is known as such, comprising two reverse-direction buffer amplifiers, the operation of which is allowed by signals DE and RE which are complements of each other. If the data bus voltage measurement block 303 is needed, it may be formed from a voltage divider, to the upper end of which a sample is taken from a suitable point between the data bus and the data communication transceiver 206 via parallel diodes 804 and 805 and from the centre of which a measurement signal V_DATA is conducted to the processor.

The voltage reducing means 205 consist of two parallel-connected, mutually reverse-direction diode chains and a bypass line connected across them and formed from two so-called back-to-back connected MOSFET transistors. The controlled voltage reduction $\Delta V$ is thus herein a sum of the forward-direction threshold voltages of three successive diodes. If the threshold voltage of one diode is for example of the order of 0.7 volts, then $\Delta V$ is approximately 2.1 volts in this arrangement. When a suitable gate voltage is applied to the MOSFET transistors of the bypass line, the voltage drop caused by them is close to zero, which corresponds to the slave device omitting to perform the voltage reduction. The gate voltage of the MOSFET transistors is generated in block 806 under control of a PWR signal delivered from the processor.

The interfaces V_DATA, DE/RE, TX, RX, and PWR on the right side of FIG. 8 may be interfaces leading directly to the processor of the device. In some cases, it is advantageous to arrange a galvanic isolation between them, which may be implemented in a straightforward manner as such by connecting the interfaces denoted by the above-mentioned terms to the processor for example via opto-isolators.

FIG. 9 illustrates an exemplary circuit diagram of the functional blocks of the master device denoted above in FIG. 4 by reference numbers 402, 403, 405 and 407. The operating voltage supply to the bipolar power bus takes place via a diode-capacitor coupling illustrated in the upper part of the figure. The data communication transceiver 405 is herein substantially similar as in the circuit diagram of the slave device (FIG. 8). The controllable switch 407 is formed herein for example by two bipolar transistors, from which an EN_12V signal delivered from the processor of the master device (not shown in the figure) forms the base voltage of an NPN transistor 901. The conductivity of the NPN transistor 901 alters the potential of the base of a PNP transistor 902 and determines whether the operating voltage to be supplied to the power bus is also applied via parallel diodes 903 and 904 to the two terminals of the data bus. In the lower part of the figure, an optional measurement coupling 905 is illustrated, by way of which the processor of the master device may monitor, if needed, the magnitude of the voltage currently applied to the terminals of the data bus.

Also in FIG. 9, it is possible to arrange a galvanic isolation between the interfaces illustrated on the left side of the figure and the processor of the controlling device, if needed. In this case, too, one way that is obvious as such of providing the galvanic isolation is to connect the interfaces illustrated herein to the processor via opto-isolators.

FIGS. 10 and 11 illustrate examples of a method performed by the master device in the two embodiments described above, which differ from each other as to how the slave device currently having the turn is assumed to determine it has gotten the turn. In FIG. 10, step 1001 corresponds to the master device applying the operating voltage to the power bus. This causes the slave devices to switch the voltage reduction on and off, but this does not show at the master device. In step 1002, the master device sends a query on the data bus, inquiring whether any of the slave devices measures a higher voltage than the above-described second limit value on the power bus. In the embodiment of FIG. 10, it is assumed that the master device sends information of the currently used second limit value in the query of step 1002. If in step 1003 the master device detects an addressing request from a slave device on the data bus, it performs the necessary addressing operations in step 1004 and returns to step 1002.

If no request was received in step 1003, the master device checks in step 1005 whether the smallest possible value of the second limit value has already been reached. If not, the master device decreases the second limit value in step 1006 and returns to step 1002, now sending information of a smaller second limit value than before in the query. If in step 1005 the master device detects that the smallest possible value of the second limit value has already been reached, it concludes that all of the slave devices have been addressed, and continues the normal operation in step 1007.

The method of FIG. 11 differs from the method of FIG. 10 in that after applying the operating voltage to the power bus in step 1101, the master device momentarily closes in step 1102 the switch which applies the power bus operating voltage also to the data bus. In step 1103, the master device checks whether this caused an addressing request from some slave device. If it did, the master device performs the necessary addressing operations in step 1104 and returns to step 1102. If no addressing request is received in step 1103, the master device concludes that all of the slave devices have been addressed, and continues the normal operation in step 1105.

FIG. 12 illustrates one example of a method performed by the slave device in the form of a state diagram. Applying the voltage to the power bus causes the slave device to be switched on, whereby it firstly enters state 1201 in which the voltage reduction is in use. In this state, the slave device receives the operating voltage from the power bus of the transportation means and conveys the operating voltage forward on said power bus, as a reduced voltage for the time being. Further, the slave device carries out data communication via the communication line data bus.

As an alternative to state 1201, in state 1202 the slave device does not perform the reduction of the operating voltage when conveying the operating voltage forward on the power bus. A transition from state 1201 to state 1202 may occur in response to the received operating voltage being lower than a predetermined first limit value and/or the device having already performed the addressing operations to carry out addressed data communication by means of said data bus. A transition from state 1202 back to state 1201 may occur in response to the received operating voltage being higher than said predetermined first limit value and the slave device not yet having performed said addressing operations. If, when in state 1201, the slave device receives a query relating to a measured power bus voltage and the measured power bus voltage corresponds to the query, the slave device enters a third state 1203 in which it performs the addressing operations. From state 1203 a transition is possible to state 1202 only, because after that the slave device no longer needs to perform the power bus voltage reduction.

FIG. 13 illustrates how the distribution of the addressing turns according to another embodiment differs from that described above. Here the transition from state 1201 to state 1203 is caused by the slave device detecting the power bus and the data bus voltages to be the same, or to differ from each other by no more than the third limit value as described above.

It is possible to modify the embodiments described above without departing from the scope of protection of the claims presented hereinafter. Especially in analogue electronics, which the embodiments of FIGS. 8 and 9 represent, it is typical that it is possible to perform the same function in numerous different ways which differ from each other in circuit topology but still fulfil the same purpose. Another example of a possible modification is to also build the data bus, in addition to the power bus, in such a way that it genuinely passes through each of the devices located therealong, instead of each device just being connected with its own interface to the same, continuous data bus main line. The devices according to FIGS. 3 and 8 are as such well prepared for this already, as at least conceptually separate data bus input and output terminals are illustrated therein.

The invention claimed is:

1. An electronic device of a transportation means, comprising:
    a power bus input interface for receiving an operating voltage from a power bus,
    a power bus output interface for conveying the operating voltage forward on said power bus, and
    a data bus interface for carrying out data communication by means of a data bus connected to the data bus interface;
wherein:
    the device comprises voltage reducing means for selectively performing a controlled voltage reduction between said power bus input interface and power bus output interface, to convey a reduced operating voltage forward on said power bus, which reduced operating voltage is lower than the operating voltage received via said power bus input interface but higher than zero,
    the device is arranged to perform said controlled voltage reduction in response to the operating voltage received via the power bus input interface being higher than a predetermined first limit value and the device not having performed addressing operations to carry out addressed data communication by means of said data bus, and
    the device is arranged to omit to perform said controlled voltage reduction in response to the operating voltage received via the power bus input interface being lower than said predetermined first limit value.

2. The electronic device according to claim 1, wherein:
    the device is arranged to omit to perform said controlled voltage reduction in response to the device having performed said addressing operations.

3. The electronic device according to claim 1, wherein:
    the device is arranged to start said addressing operations in response to the device not having performed said addressing operations and the operating voltage received via the power bus input interface being higher than a second limit value.

4. The electronic device according to claim 3, wherein:
the device is arranged to receive information of said second limit value via said data bus interface.

5. The electronic device according to claim 1, wherein:
the device is arranged to measure whether a difference of the operating voltage received via the power bus input interface and a data bus voltage measured via the data bus interface is smaller than a third limit value, and
the device is arranged to start said addressing operations in response to the device not having performed said addressing operations and the difference of the operating voltage received via the power bus input interface and the data bus voltage measured via the data bus interface being smaller than said third limit value.

6. An electronic controller device of a transportation means for controlling at least one electronic device, wherein the controller device comprises:
a power bus supply interface for supplying an operating voltage to said power bus,
a controller device data bus interface for carrying out data communication by means of said data bus,
a transmitter configured to send an addressing query on said data bus for causing said at least one electronic device to start addressing operations, which addressing query involves information of a limit value sent on said data bus;
wherein said at least one electronic device has to receive a voltage higher than that limit value from the power bus in order to start the addressing operations.

7. A method for performing addressing operations in an electronic device of a transportation means, the method comprising:
receiving an operating voltage from a power bus of the transportation means,
conveying the operating voltage forward on said power bus,
carrying out data communication via a data bus,
reducing the operating voltage conveyed to the power bus to a voltage in a controlled manner lower than the received operating voltage but different from zero in response to the received operating voltage being higher than a predetermined first limit value and the device not having performed the addressing operations to carry out addressed data communication by means of said data bus, and
omitting to perform said controlled voltage reduction in response to at least one of the following being satisfied:
the received operating voltage is lower than said predetermined first limit value
the device has performed said addressing operations.

8. The method according to claim 7, comprising:
starting said addressing operations in response to the device not having performed said addressing operations and the operating voltage received via a power bus input interface being higher than a second limit value.

9. The method according to claim 8, comprising:
receiving information of said second limit value via said data bus.

10. The method according to claim 7, comprising:
measuring whether a difference of the received operating voltage and a measured data bus voltage is smaller than a third limit value, and
starting said addressing operations in response to the device not having performed said addressing operations and the difference of the received operating voltage and the measured data bus voltage being smaller than said third limit value.

* * * * *